T. G. Smith.
Seed Planter.
No. 88,989. Patented Apr. 13, 1869.
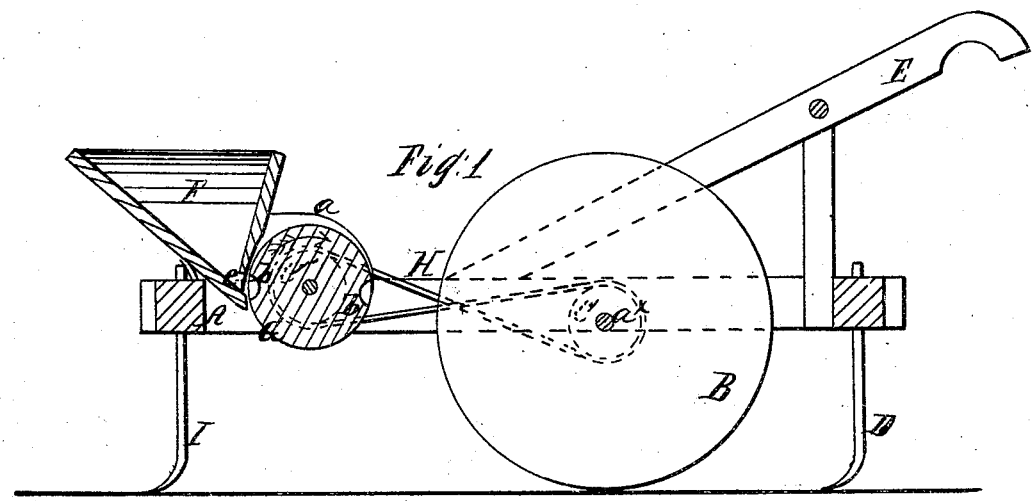
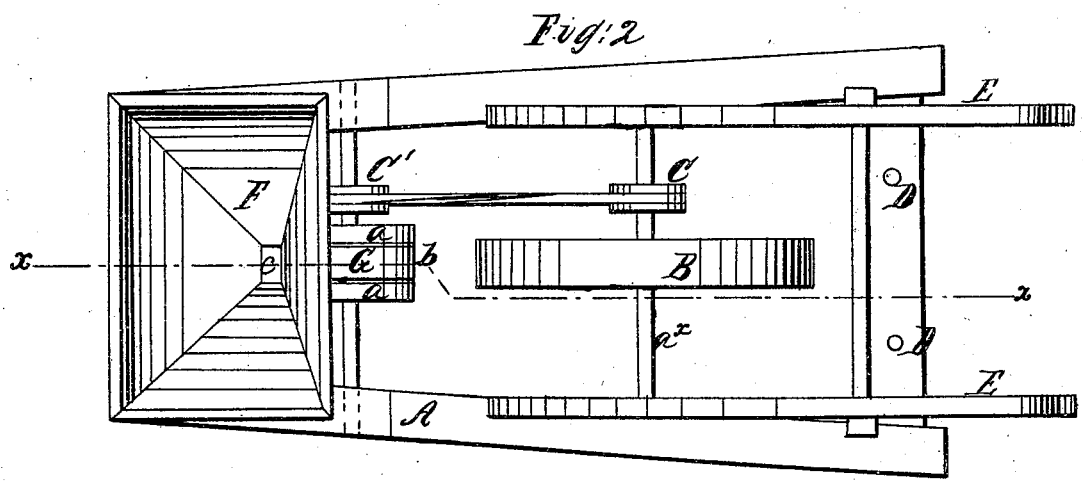
Witnesses
Theo Tusche
Wm Dean Overll
Inventor
Thos. G. Smith
Per Munn & Co
Attorneys

United States Patent Office.

THOMAS G. SMITH, OF CANTON, MISSISSIPPI.

Letters Patent No. 88,989, dated April 13, 1869.

IMPROVEMENT IN SEED-PLANTERS.

The Schedule referred to in these Letters Patent and making part of the same.

*To all whom it may concern:*

Be it known that I, THOMAS G. SMITH, of Canton, in the county of Madison, and State of Mississippi, have invented a new and improved Seed-Planter; and I do hereby declare that the following is a full, clear, and exact description thereof, which will enable others skilled in the art to make and use the same, reference being had to the accompanying drawings, and to the letters of reference marked thereon.

This invention relates to a new and improved seed-planter, of that class in which a rotary seed-distributing wheel is employed.

The invention is illustrated by the accompanying drawings, in which—

Figure 1 is a side sectional view of the machine, and

Figure 2, a plan or top view of the same.

Similar letters of reference indicate like parts.

A is the frame of the machine, which is supported by a wheel, B, having a concentric pulley, C, on its axle $a^\times$.

At the rear of the frame, behind the wheel B, there are covering-shares D and handles E, attached to the frame, for the purpose of guiding the machine as it is drawn along.

On the front part of the frame the hopper F is placed, and at the rear of the hopper, between side-pieces $a$, a wheel, G, is fitted, having cells $b$ made in its periphery.

The periphery of this wheel is quite close to the bottom of the hopper F, so that the corn, or other seed, may pass from the same into the cells $b$, as the latter pass the discharge-opening $c$, at the bottom of the hopper.

The wheel G is rotated in the direction indicated by arrow 1, from the wheel B, by means of a cross-band, H. which passes around the pulley C, and around a pulley, C', on the axis of G, and the seed is discharged from the cells $b$ into a furrow made to receive it, by a share, I, the seed being covered by the shares D.

The seed may be planted at a greater or less distance apart, by having pulleys C C', of different sizes, to regulate the speed of the rotation of wheel G, as required.

Any number of cells, $b$, may be made in the periphery of wheel G, and the rear side of the hopper F should have a position as nearly vertical as possible, in order to admit of the wheel G being placed as close to it as necessary, while the front side of the hopper is inclined in a direction to the rear of the planter. The wheel being thereby close to the opening of the hopper, the seed is directed to the cells of the distributing-wheels G.

The seed is raised from the bottom of the hopper in the direction of the arrow, and carried around until it drops.

By this arrangement, there is no escape of seed, except such as are carried off by the wheel G. There is no clogging between the wheel and hopper.

Having thus described my invention,

I claim as new, and desire to secure by Letters Patent—

The hopper, constructed with the inclined front side and a nearly vertical rear side, and arranged with the seed-raising wheel G, as described and combined with the supporting-wheel B and shares I D, as and for the purpose set forth.

The above specification of my invention, signed by me, this 30th day of July, 1867.

THOMAS G. SMITH.

Witnesses:
W. J. MOSBY,
GEO. W. SMITH.